Figure 1:
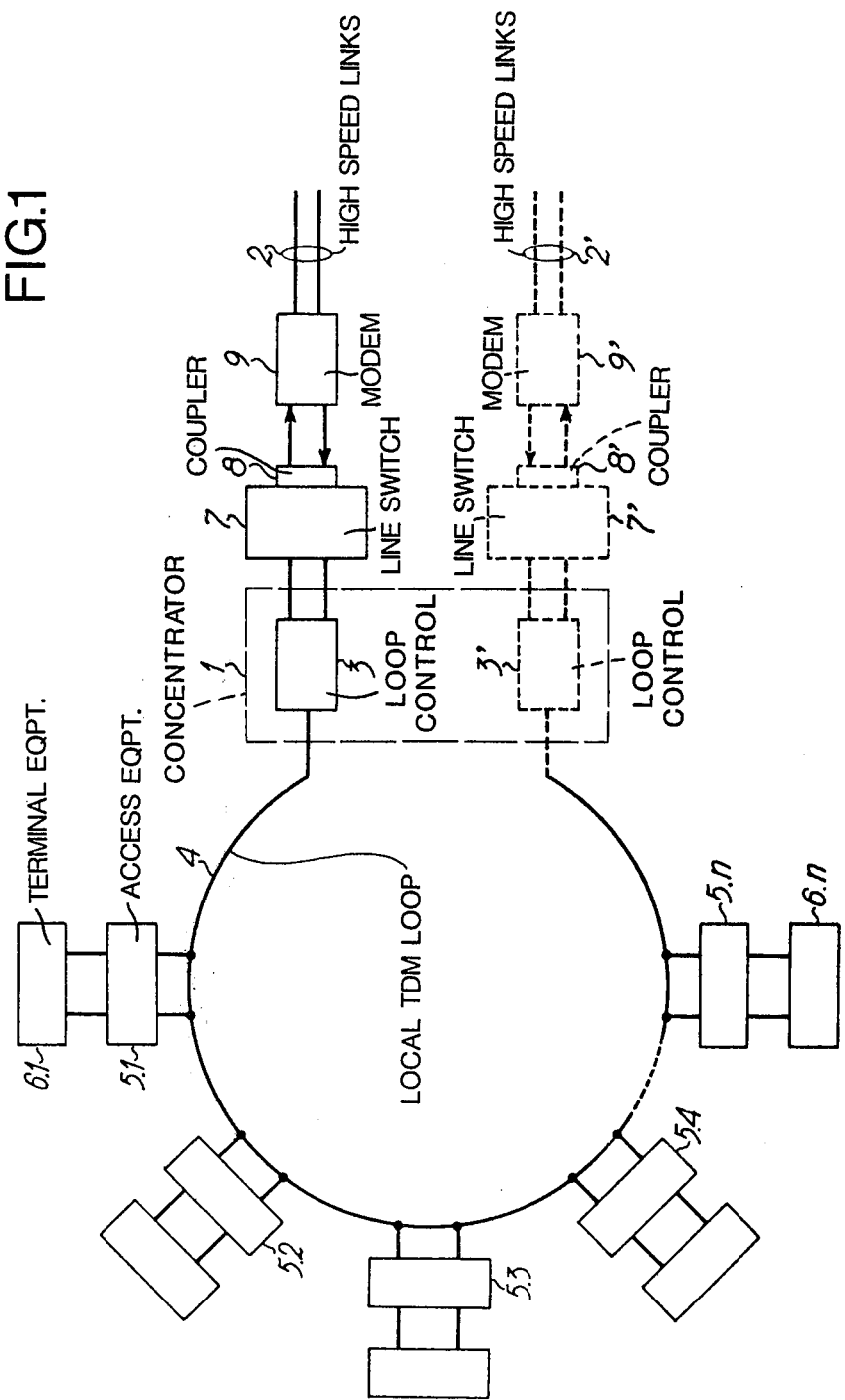

United States Patent [19]

Roger et al.

[11] 4,423,507

[45] Dec. 27, 1983

[54] COMMUNICATIONS SYSTEM FOR INTERCONNECTING A PLURALITY OF ASYNCHRONOUS DATA PROCESSING TERMINALS

[76] Inventors: Renoulin Roger, 29, rue Jean Mailleux, Thorigne/Vilaine, 35510 Cesson; Jean Y. Le Brun, 34, Boulevard Clemenceau, 35100 Rennes, both of France

[21] Appl. No.: 244,066

[22] Filed: Mar. 16, 1981

[30] Foreign Application Priority Data

Mar. 20, 1980 [FR] France .............................. 80 06774

[51] Int. Cl.³ .......................... H04J 3/16; H04J 6/00
[52] U.S. Cl. ....................................... 370/89; 370/92
[58] Field of Search ..................... 370/89, 90, 92, 86, 370/79, 80, 100, 105, 58, 95, 84, 56; 340/825.05, 825.52

[56] References Cited

U.S. PATENT DOCUMENTS

| | | | |
|---|---|---|---|
| 3,749,845 | 7/1973 | Fraser | 370/89 |
| 3,790,717 | 2/1974 | Abramson et al. | 370/89 |
| 3,796,835 | 3/1974 | Closs et al. | 370/89 |

FOREIGN PATENT DOCUMENTS

| | | |
|---|---|---|
| 2205260 | 8/1972 | Fed. Rep. of Germany . |
| 2277487 | 1/1976 | France . |
| 2331221 | 6/1977 | France . |

OTHER PUBLICATIONS

Layec et al., "Microprocessors and Packet Switching Networks", *Microcomputer Architectures*, Oct. 1977, pp. 94–101.

*Primary Examiner*—Douglas W. Olms
*Attorney, Agent, or Firm*—Laff, Whitesel, Conte & Saret

[57] ABSTRACT

A communication system connects a number of asyncrhronous remote data processing terminals, operating at different speeds, to a high speed switching and communication network. One or two telephone pairs are used as a TDM link between the terminals. The number of terminals that may be connected can be greater than the number of terminals that could be connected if all terminals were active simultaneously. A signalling function or flag is used in the system to monitor the state of each terminal. This function, which distinguishes the resting or activity of the terminals, is based on a low speed search for the idle terminals, on a detection of their change of state, and on the time sharing allocation of the system's transmission resource between the active terminals. The time sharing of the transmission resource is adaptive.

2 Claims, 7 Drawing Figures

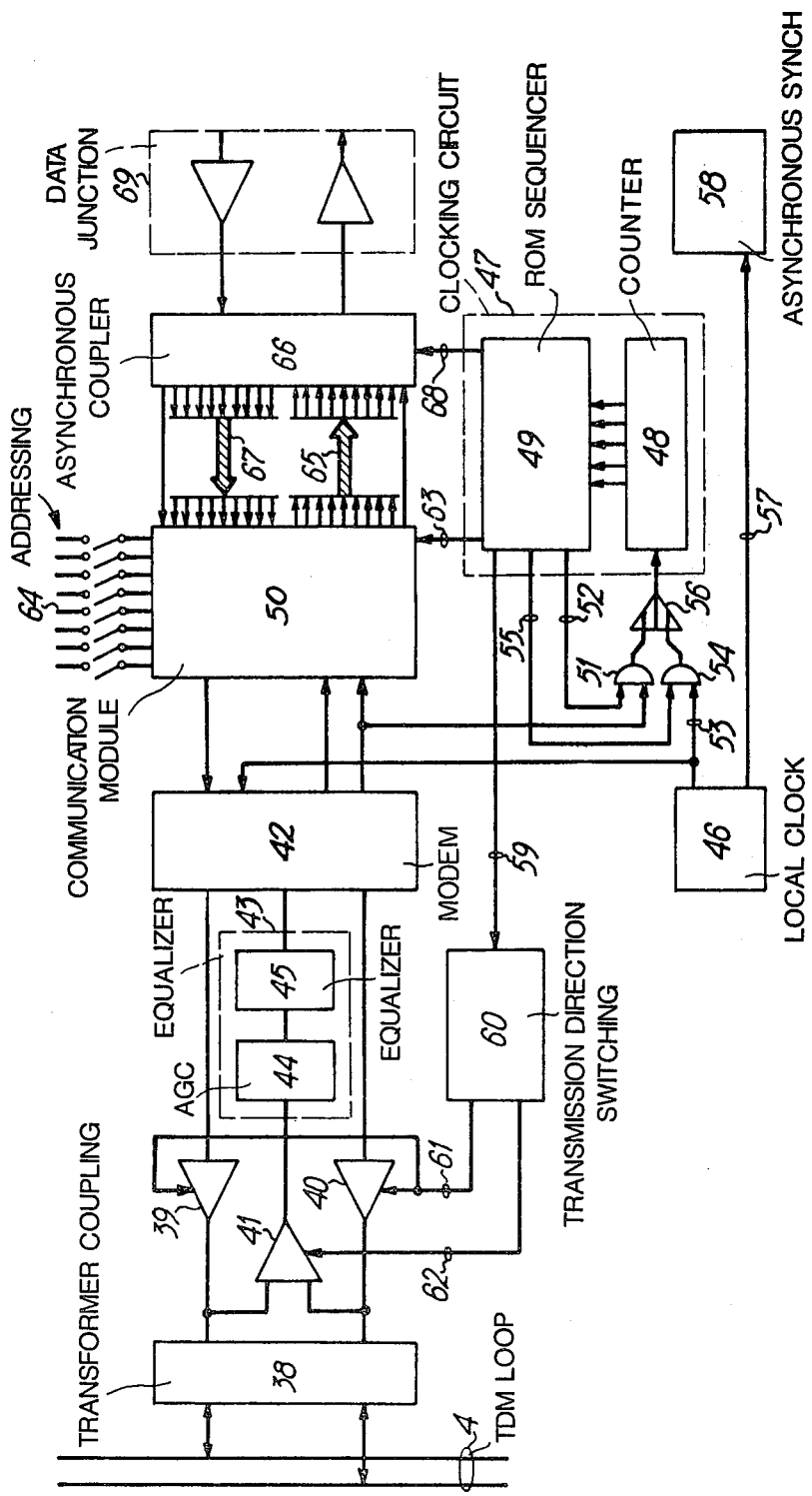
FIG.4 ACCES EQPT. 5

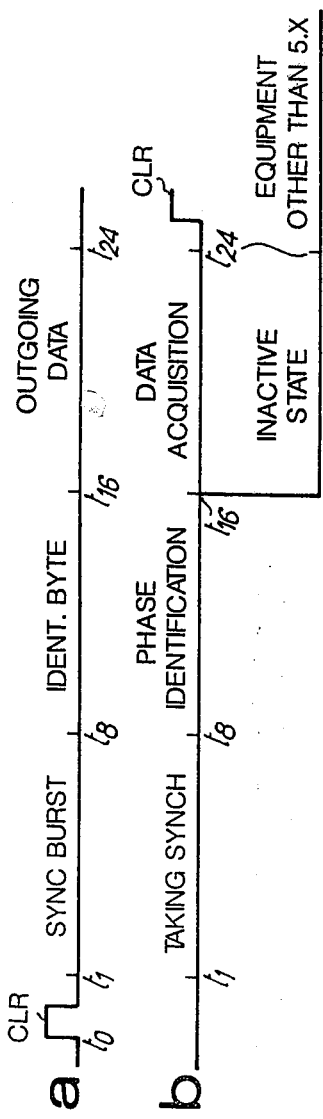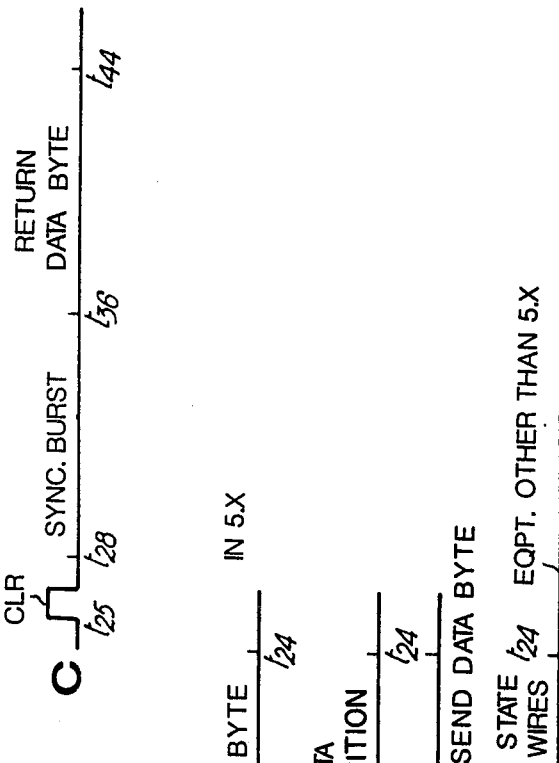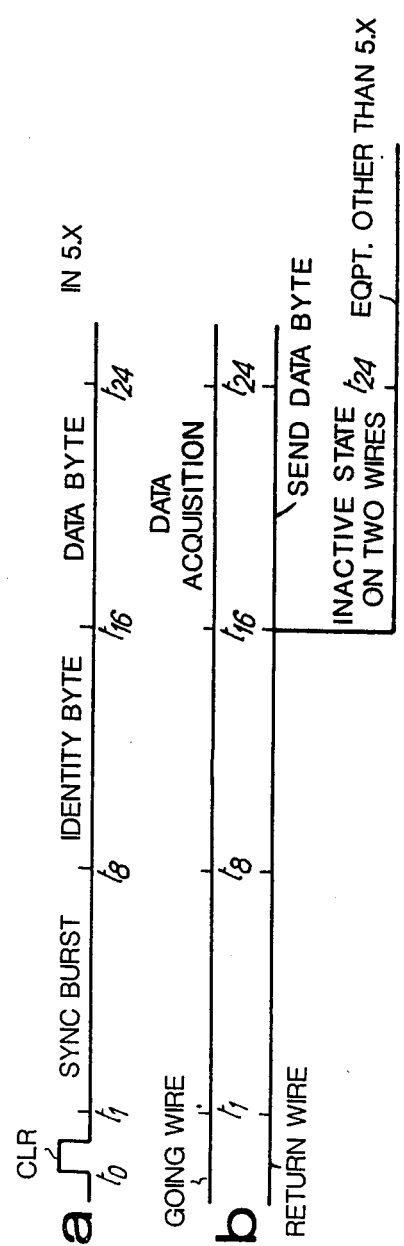
FIG.5
FIG.7

COMMUNICATIONS SYSTEM FOR INTERCONNECTING A PLURALITY OF ASYNCHRONOUS DATA PROCESSING TERMINALS

The present invention relates to a communication system for connecting a number of asynchronous remote data processing terminals, operating at different speeds, to a high speed switching and communication network.

In particular, the invention relates to such a system using one or two telephone pairs as a link between terminals. The number of terminals that may be connected can be higher than the number that would be allowed if all terminal were active simultaneously. In this regard, a signalling function or flag is used in the system to watch the state of each terminal. This function, which distinguishes the resting or activity of the terminals, is based on a low speed search for the idle terminals, on the detection of their change of state and on the allocation, in time sharing, of the transmission resource between the active terminals as a function of their needs. The time sharing of the transmission resource is adaptive.

In accordance with one feature of the invention, the system is comprised of a central control circuit, associated with a microprocessor and secondary control circuits. Each secondary control circuit is associated with a terminal, connected to the central control circuit by a telephone line. The conrol unit is connected by a high speed link to a communication and high speed switching center by couplers and virtual line switches. The microprocessor is adapted to effect the virtual line switchings. The control circuit is comprised of a central switching means which is capable of taking two possible states, one being the transmission state and the other one being the reception state. Each secondary control circuit is also able to assume two states, one being the receiving state and the other one transmission state. The central control circuit and the secondary control circuits have synchronization means for transmitting a sync burst, and means to transmit and receive bytes of information (one-by-one). The central control circuit also has addressing means for transmitting an address byte for selecting the secondary control circuit which is to be interrogated. Each secondary control circuit is comprised of an address identification circuit. The central control circuit has a central ordering unit switching the for switching means of the central control circuit to the transmission state at the beginning of each interrogation sequence. Then, the synchronization means is coupled to the line by way of the switching means, then the addressing means, then the byte transmission means. Thereafter, the the switching means is changed over to the receiving state and the synchronization means is coupled to the line. Each secondary control circuit is comprised of a secondary sequencer for switching, between two interrogation sequences, the switching means of the secondary control circuit, to place the secondary control circuit in the reception mode, couple the synchronization means to the line by way of the switching means. Then in response to the sync burst, the synchronization means activates the secondary ordering unit to couple the address identification circuit to the line. If the response is negative, there is an isolation of the switching means from the line. If the response is positive, the secondary sequencer is activated to couple the byte receiving means to the line. Then, the sequencer couples the switching means to the transmission state and couples the synchronization means of the secondary control circuit to the line, and then its byte transmission means. Then, the switching means is switched to the receiving mode. The synchronization means of the central control circuit couples the byte reception means to the line in response to the reception of the sync burst from the secondary control circuit.

In accordance with another feature, between the central control circuit and the secondary control circuits a pair of lines is provided, with one outward and one return line. The secondary control circuits now has only means for receiving the synchronization, and the switching means is removed in all the control circuits.

Figure 2:
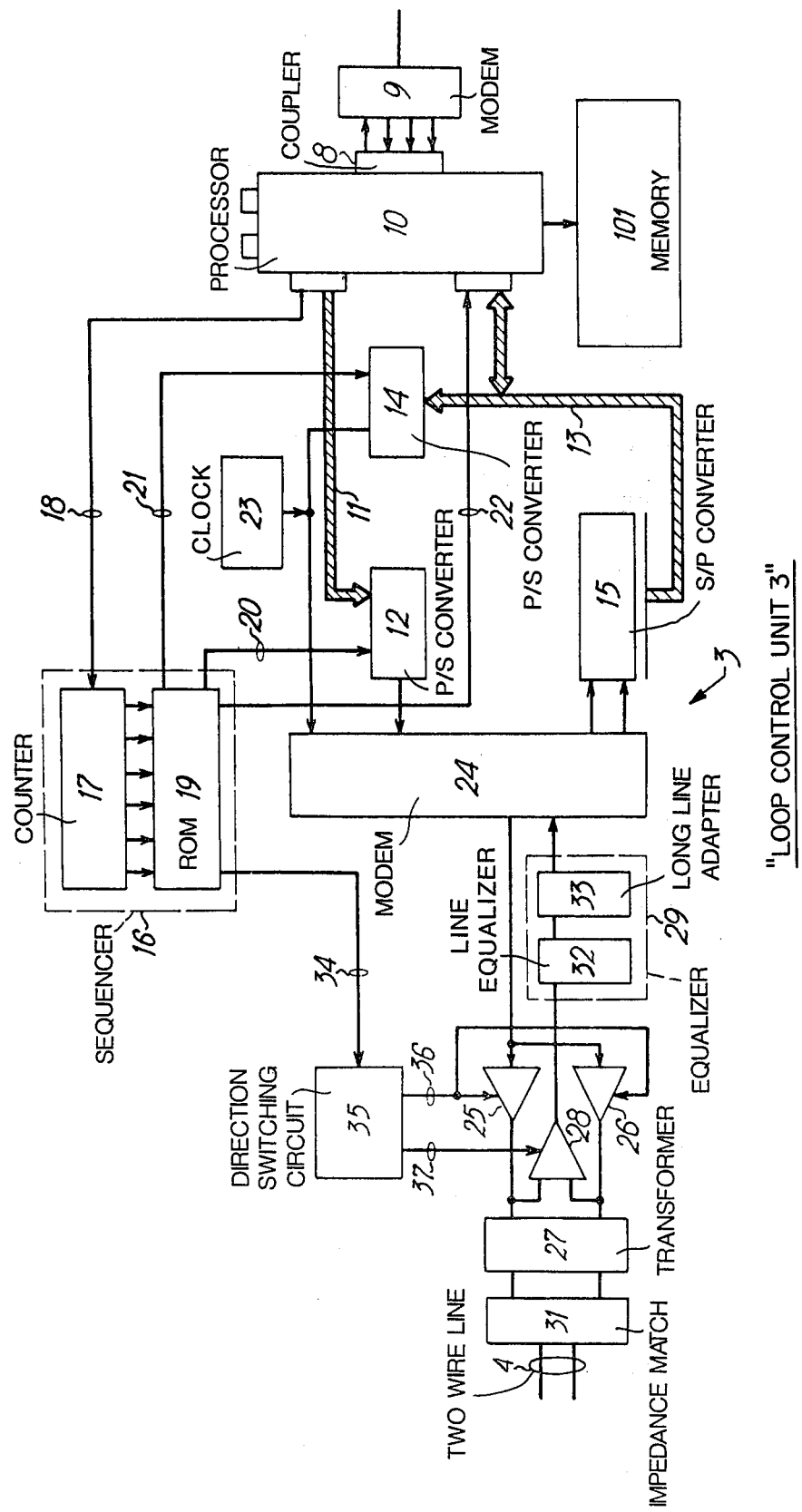
Figure 3:
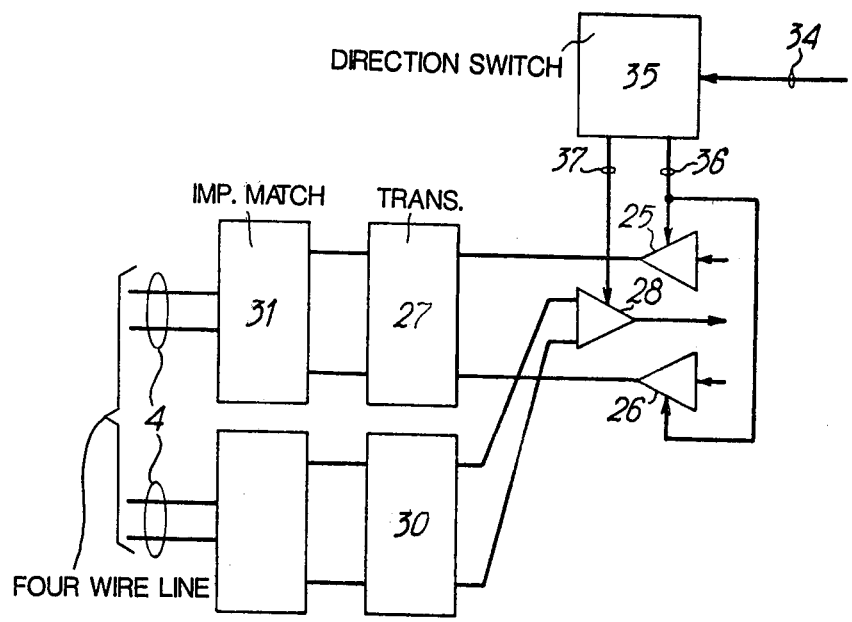
Figure 6:
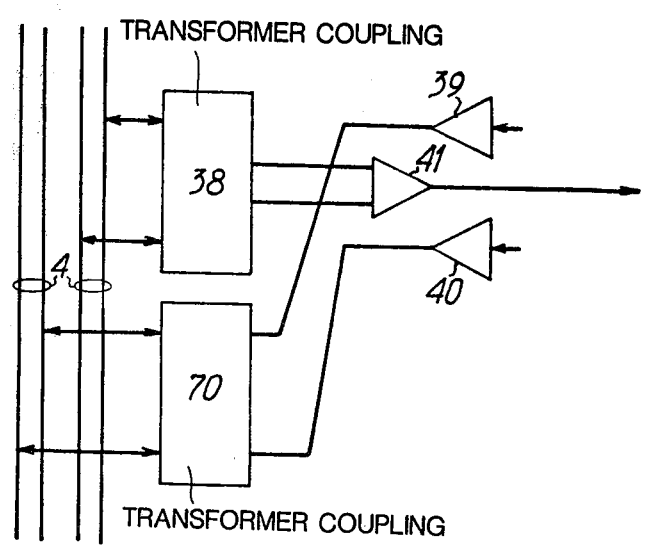

The above mentioned characteristics of the invention as well as others will become clearer upon reading the following description of embodiments, the said description being made with reference to the attached figures, among which:

FIG. 1 is a schematic block diagram of a first variant of the system in accordance with the invention, FIG. 2 is a block diagram of the control unit of the local loop of FIG. 1, FIG. 3 is a block diagram of the switching means for the control unit, FIG. 4 is a block diagram of accessing equipment for the system of FIG. 1, FIG. 5 is a timing diagram illustrating the operation of the first variant of the system of FIG. 1, FIG. 6 is a block diagram of the switching circuits used in a second operating variant of the system of FIG. 1, and FIG. 7 is a timing diagram illustrating the second operating variant of the system of FIG. 1.

The FIG. 1 represents a communication system concentrator 1 connected by high speed links 2 and 2' to a high speed switching and communication network, not shown. The concentrator 1 is comprised of two loop control units 3 and 3' respectively connected to the two ends of a cable 4. On cable 4, a number of loop access equipment 5.1 to 5.n are connected in parallel. Each equipment 5.1 to 5.n is connected to a terminal 6.1 to 6.n.

In other respects, the control units 3 and 3' are respectively connected to virtual line switches 7 and 7' which are respectively connected to links 2 and 2' by couplers 8 and 8' and modems 9 and 9'.

The loop structure of the system, with the two units 3 and 3' allows, in the case of an accidental break of cable 4, or a breakdown of one of the units 3 or 3' to maintain possible access to all accessing equipments 5.1 to 5.n which may be taken charge of by one or the other of the units, the change between units being done in accordance with a schedule or protocol. The virtual line switches 7 and 7' may be conventional equipments such as those described in the French patent application No. 79 15742 filed on the June 13, 1979 for "REMOTE DATA PROCESSING CONCENTRATOR FOR TRANSMISSION NETWORK AND DATA PACKET SWITCHING" (U.S. Patent application Ser. No. 158,568). They allow access of concentrator 1 to the high speed communication network, not shown. The couplers 8,8' and 9,9' are assumed to be conventional and meet X25 transmission standards. The switches 7 and 7' are, furthermore, connected between themselves to insure, in case of need, the relief protocol between the units 3 and 3'.

The FIG. 2 shows the block diagram of a loop control unit 3 or 3'. It consists of a processor 10, capable of carrying out the switching of virtual lines and to ensure, associated to the appropriate software and a communications memory 101, the start-up of communication of terminal 5.1 to 5.n with terminals hooked in the communication network on the high speed synchronous line 2 or 2'. In the control unit, the processor 10 is connected by a bus 11 to a parallel-serial converter 12, and by a data bus 13, one one hand to the parallel input of a parallel serial converter 14 and, on the other hand to the parallel output of a serial parallel converter 15. The control unit has also a sequencer ordering circuit 16 which is made up of a sequencing counter 17 whose initializing input is connected, by wire 18, to one output of processor 10, and of a read only memory 19 for sequencing whose addressing inputs are connected to the outputs of counter 17. The read only memory 19 has two outputs respectively connected to the converters 12 and 14, by the wires 20 and 21, and one output connected to the processor 10, by a wire 22. A clock generator 23 is also provided, to distribute clocking signals to circuits 12, 14 and 17. The outputs of converters 12 and 14 are connected to the data input of a modem 24, whose transmission clock input is connected to generator 23. The data output of modem 24 is connected to the series data input of converter 15 and the reception clock output of modem 24 is connected to the clock input of converter 15. The modulated signal output of modem 24 is connected, by an amplifier 25 and an amplifier 26 to the two terminals of the unit side of an isolating transformer 27 to ensure electro-galvanic isolation by a "floating" operation. The two terminals on the unit side of transformer 27 are also connected to the input terminals of a differential amplifier 28 whose output is connected through an equalizer 29 to the modulated signal input of modem 24. The terminals, on the line side, of transformer 27 are respectively connected to the two wires of the line 4, in the case where the cable is made up of a single two wire line. The communication memory 101 with the microprocessor 10 allows adapting to the interrogation rates of the terminals, individually according to their rates.

In FIG. 3, we have shown a branching variant when we use a 4 wire cable. The inputs of differential amplifier 28 are thus connected to the unit side terminals of a second isolating transformer 30 whose terminals on the line side are connected to the second pair of cable 4.

Impedance matching equipment allows, namely in the case of a two-wire link, shown in FIG. 2, used alternately, to connect the low impedance amplifiers 25 and 26 to transmit sufficient power to attack the line, when the control unit transmits, or at high impedance when the control unit receives.

The clock 23 scans the timing of the sequencing counter 17 which addresses memory 19, which distributes the instructions of an appropriate program to circuits 10, 12 and 14.

Impedance adapters 31 are provided at the ends of cable 4 to avoid signal reflections and, more particularly short impulses used in the "baseband" mode.

The equalizer 29 consists of a so-called line equalizer 32 preceded by an adaptive gain control apparatus 33. The apparatus 33 is necessary when the line 4 is very long, more than a few kilometers, in order to ensure, whatever may be the distance of an equipment 5.1 to 5.n, a correct reception level. The apparatus 32 serves to correct the gradual attenuation of the line to the high frequency components of the biphase differential impulses of the baseband signals.

One output of memory 19 is connected, by a wire 34, to the control input of a transmission direction switching circuit 35. One output 36 of circuit 35 is connected to the impedance control inputs of amplifiers 35 and 26 while another output 37 is connected to the impedance control input of differential amplifier 28.

FIG. 4 illustrates the block diagram of accessing equipment 5.1 to 5.n. It consists of, like a control unit 3 or 3', an isolating transformer 38, whose unit side terminals are connected to the wires of the two wire line 4 and whose equipment side terminals are connected, on one hand, respectively to the outputs of two amplifiers 39 and 40, and, on the other hand, respectively to the two inputs of a differential amplifier 41. The inputs of amplifiers 39 and 40 are connected, in parallel, to the modulated signal output of a modem 42 operating in "baseband". The output of amplifier 41 is connected to the modulated signal input of modem 42, through an equalizer 43, comprised of an automatic gain control apparatus 44 and a so-called equalizer 45.

The equipment also has a local clock 46 and a clocking circuit 47. The clocking circuit 47 consists of a clocking counter 48 and a read only sequencing memory 49. The demodulated signal output of modem 42 is connected to the received data input of a communication module 50 while the modulating signal input of modem 42 is connected to the data to be transmitted output of module 50.

The reception clock output of modem 42 is connected to the first input of an AND gate 51 whose second input is connected to the output 52 wire of memory 49. One output of the local clock 46 is connected to a first input of an AND gate 54 whose second input is connected by a wire 55 to an output of memory 49. The outputs of gates 51 and 54 are respectively connected to the inputs of an OR gate 56 whose output is connected to the clocking input of counter 48. One output 57 of the local clock 46 is connected to the clocking input of an asynchronous rate generator 58.

One output 59 of memory 49 is connected to the control input of a transmission direction switching circuit 60. One output 61 of circuit 60 is connected to the impedance control inputs of amplifiers 39 and 40 while another output 62 of 60 is connected to the impedance control input of differential amplifier 41. One output 63 of memory 49 is connected to the communication module 50. Outputs of module 50 are connected to a set of contacts 64 enabling by their predetermined selective closure to realize the address of the equipment. The number of contacts in the set of contacts 64 is equal to eight in order to make up an eight bit address word. The communication module has one parallel output connected by a link 65 to the parallel inputs of an asynchronous coupler 66, as well as parallel inputs connected by a link 67 to the coupler 66. The clock input of coupler 66 is connected by 68 to the memory 49. On the terminal side, the asynchronous coupler has one output connected through a data junction 69 to the input of associated terminal 6.1 to 6.n and one input connected, always through the data junction 69, to the same terminal. The junction 69 is preferably a data junction of type V24.

In the first two embodiments described, we assume that the units 3 and 3' and the equipments 5.1 to 5.n use baseband differential biphase modulator-demodulators. In the case of relatively long transmission, 10 km or more, and in the cases of high bit rates, at least 19200 bauds, these modems can be completed by line equalizers, to correct the attenuation, which increases in proportion with the frequency components of the signal. They may also be completed by automatic gain correctors to compensate for the the different levels introduced by the distances between the units 3 and 3', one one hand, and the equipments 5.1 to 5.n on the other hand.

In the following, we shall assume that a single control unit is in operation and interrogates the equipments 5.1 to 5.n.

In a first embodiment, it is assumed that the cable 4 is made up of a two wire line permitting an alternating link.

The diagrams of FIGS. 5a to 5c illustrate the operation in the case of a call from unit 3 to equipment 5.x, or a two-wire line. Between each transmission burst intended for a terminal, unit 2 makes a break in the carrier on line 4 in order that all the demodulators of equipments 5.1 to 5.n connected may resynchronize at each burst. It is the reset to zero CLR signal of FIG. 5a.

At a time t1, after signal CLR, unit 3 transmits a sync burst made up of a known byte, such as "10101010". The acquisition of synchronization is of primary importance for the remainder of the sequence and is made possible by a salient feature tied to the type of modulation used in these modems and which concerns carrier detection which yields the data within the time of a bit duration.

Then at time t8, always on FIG. 5a, unit 3 transmits an 8-bit byte to identify the equipment interrogated, that is the address of the equipment interrogated. With an 8-bit byte, we can obtain $2^8=256$ different addresses or $2^7=128$ different addresses if one bit is reserved to check parity.

Then at time t17, unit 3 transmits on line 4 the 8-bit data byte intended for equipment 5.x interrogated, the outgoing 8-bit byte terminating at time t24.

In the equipments 5.1 to 5.n connected at line 5, as soon as synchronization has been acquired between t1 and t8, there is a change of state from the rest phase to the identification phase, as illustrated in FIG. 5b. In the identification phase, the communication module 50 carries out a series comparison, bit by bit, of the address received from unit 3 to an identity stored in the set of contacts 64 of the equipment. Thus, at time t16, only equipment 5.x has obtained a positive comparison, the other equipments having recorded negative comparisons between t9 and t16. The top line of FIG. 5b indicates the inactive state of the equipments not questioned, after time t16, while the bottom line of FIG. 5b indicates that in equipment 5.x there is a transition to the useful data acquisition phase.

The 8-bit byte data acquisition phase lasts, like the identification phase, 8 time units. At time t24, at the end of acquiring the useful 8-bit byte of data, equipment 5.x proceeds to transfer the byte of data to the asynchronous coupler 60 in charge of moving the data in an asynchronous mode to the terminal 8.x.

We note that the 8-bit data byte transmitted by the control unit may be either a byte of useful data or a stuffing byte or character FF.

The acquisition phase of the 8-bit data byte being completed, the equipment may take on one of three possible states:

either trigger the procedure to transmit a useful data byte to the control unit, this return byte thus being present at the output of the asynchronous coupler connected to junction 67;

either trigger the procedure to transmit a stuffing byte, if terminal 6.x is off; this case could be illustrated by a closed loop in the case of the telephone;

either trigger the transmission of a byte or silent character FE, if the terminal is on, but in a silent period.

During this processing phase for the byte to be transmitted to the control unit, the communication module 50 transmits the received byte, if it is useful data, to terminal 6.x, in series through the asynchronous coupler 66, by line 65. We note that the stuffing bytes are excluded from the data code, which is easily done in the case of asynchronous terminals whose useful syntax employs only 128 codes from the possible 256.

During reception of the message transmitted by the control unit, the ordering circuit is activated by the receiving clock signal restored by modem 42 which transmits this clock signal to the ordering counter by gates 51 and 56, gate 51 being activated by memory 49, via wire 52. After the end of the data byte acquisition phase, memory 49 activates gate 54, via wire 55, such that the local clock signals 46 are transmitted, on one hand, to the ordering counter 48, by 54 and 56, and on the other hand, to modem 42 to serve for return transmission clock. In practice, a quiet period is provided in the program of memory 49 between the termination of activation of wire 52 and the beginning of activation of wire 55. During this quiet period or guard time, line 4 is completely free, because from the end of transmission of the useful data byte by the control unit, this one stops transmitting the carrier on the line, as requested by the ordering memory 19.

As soon as wire 55 is activated, modem 42 transmits on line 2, a sync burst, to the control unit which enables modem 24 to restore the return clock. The return transmission is illustrated in FIG. 5c, the timing diagram indicating after time t24, a guard time with a line return to zero which lasts until time t28, then the time interval from t28 to t36 in which the return sync burst is transmitted, and finally the time interval t36 to t44 during which the return byte is transmitted. It will be recalled that this return data byte may contain useful data, a stuffing character Ff or a silence character FE.

At the end of a sequence, after receiving in the control unit 3 or 3' the return data byte, which is present in the serial to parallel converter 15, the processor 10 is warned of this situation. It thus discriminates among the useful data characters or the signalling or stuffing characters, before proceeding to set up data packets and the switching of virtual lines toward the high speed network.

It will again be noted that, in the control unit, from the onset of transmission of the outgoing data byte, memory 19 causes flip flop 35 to change state such that the amplifiers 25 and 26 are switched to a high impedance and differential amplifier 37 is activated. In other respects, in equipment 5.x, immediately after acquiring the outgoing data byte, memory 49 causes flip flop 60 to change state which results in amplifiers 39 and 40 to be in a low impedance state and amplifier 41 to be at rest.

We note again that in equipments 5.1 to 5.n other than equipment 5.x, from the end of the identification phase, which is negative for them, the amplifiers 39 to 41 are switched to a very high impedance to achieve their disappearance at least during the time interval from t16 to t44. To this end, the negative identification results in switching the activation of 52 and 55, such that counter 48 receives the local clock to advance the program, of memory 49, which controls the circuit 60. Thus, in the return transmission, we avoid receiving at the control unit parasitic bits from non-interrogated equipment.

The equipment shown in FIG. 4, provided to operate with a two wire line may be adapted to operate with a four wire line as illustrated in FIG. 3. The isolating transformer 38 mounted on the outgoing pair of the four wire line is paired by an isolating transformer mounted on the return pair. Amplifier 41 remains associated with transformer 38 while negative amplifiers 39 and 40 are associated with transformer 70. The circuit 60 as well as the local clock 46 and the set of gates 51, 54 and 56 are removed, because the modem 42 permanently receives the clock signal from the outgoing pair and may thus apply these signals directly to counter 48.

FIGS. 7a and 7b illustrate the bilateral exchange sequence between the control unit 3 or 3' and equipment 5.y, in the case using a four wire line. The transmission phase from the control units to the equipments is shown in FIG. 7a. We observe that it is the same as that in FIG. 5a, for the case of a two wire line, that is, it consists of a time to reset the equipment to zero by suppression of the carrier on the outgoing pair, at time to, then from t1 to t8, the transmission of a sync burst, then from t9 to t16, the address of equipment 5.y being interrogated is transmitted and finally, from t17 to t24, transmission of the 8-bit data byte. After this phase, the control unit continues to transmit the carrier on the outgoing pair.

The corresponding operating phase of equipment 5.y is shown in FIG. 7b. At $t_o$ the equipment is at rest, between t1 and t8, it synchronizes itself on the burst, at t16, it has recognized its address, and thus, between t17 and t24, it can send on the return pair the data byte which it has to transmit to the control unit. This results in a time saving, with respect to the operation in the two wire case, which is equal to the return time of the modems or guard time mentioned above plus the time of the return sync burst.

In other respects, between times t9 and t16, equipment other than 5.y isolates itself from the return pair, during a time interval largely exceeding t24.

The operating mode with a four wire line obviously allows the insertion of regenerative repeaters in each transmission direction which allows the formation of longer faster loops, which is certainly very important when a bit rate of 2 Mbit/s is sought. In practice, for this case the price of a second pair is approximately compensated for by the loop bit rate which is almost doubled.

The embodiments of the invention in which an exclusive property or privilege is claimed are defined as follows:

1. A communication system for connecting many asynchronous data processing terminals which are operating at different speeds to a high speed switching and communication network; said system comprising central control circuit means associated with microprocessor means and a plurality of secondary control circuit means; each of said secondary control circuit means being associated with a terminal which is connected to the central control circuit means by a telephone line; the central control circuit means being coupled via a high speed transmission link to the high speed switching and communication center by coupler means and line switch means; means responsive to the microprocessor means for controlling operation of said line switch means; the central control circuit means having central switching means which are capable of taking either a transmitting state or a receiving state; each secondary control circuit means also being able to assume either a receiving state or a transmitting state, means for synchronizing the central control circuit means and the secondary control circuit means for transmitting a sync burst; means for transmitting and receiving bytes of information one-by-one; the central control circuit means is also having addressing means for transmitting an address byte for selecting the secondary control circuit means which is to be interrogated; each of said secondary control circuit means having an address identification circuit means; the central control circuit means having a central sequencing unit means for:
   (1) operating the switching means of the central control circuit to the transmitting state at the beginning of each interrogation sequence,
   (2) coupling the synchronization means to the line by way of the said switching means,
   (3) operating the addressing means,
   (4) operating the byte transmission means,
   (5) switching the switching means to the receiving state, and
   (6) coupling the synchronization means to the line; each of said secondary control circuit means having a secondary sequencing unit for:
      (a) switching the switching means of the secondary control circuit means between two interrogation sequences to the receiving mode,
      (b) coupling the synchronization means to the line by way of said switching means,
      (c) activating the secondary interrogation means in response to the sync burst to couple the address identification circuit to the line means (i) responsive to a negative addressing of a line for causing the isolation of said switching means from the line, and (ii) responsive to a positive addressing of the line for activating a secondary ordering unit to link the byte receiving means to the line; means responsive to the ordering unit for:
   (1) placing the switching means in the transmitting state,
   (2) coupling the synchronization means of the secondary control circuit means to the line,
   (3) coupling the byte transmitting means to the line,
   (4) switching the switching means to the receiving mode; and
   (5) means responsive to the synchronization means of the central control circuit means for coupling the byte receiving means to the line in response to the reception of the sync burst from the secondary control circuit means.

2. The system in accordance with claim 1, characterized in that a pair of lines extend between the central control circuit means and the secondary control circuit means, said pair of lines comprising an outgoing line and a return line, the secondary control circuit means having only means for receiving synchronization signals.

* * * * *